Feb. 14, 1928.
W. H. FROST
1,659,195
ELASTIC MATERIAL
Filed Nov. 18, 1925
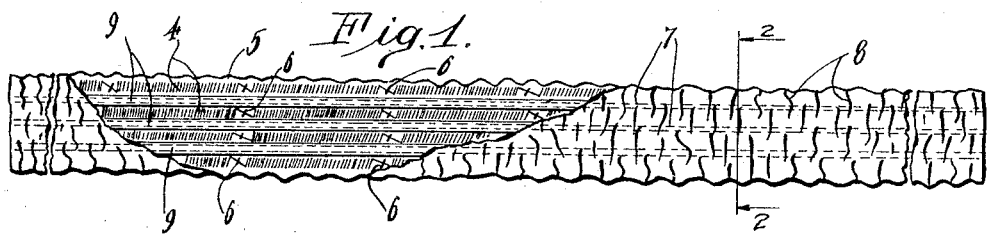
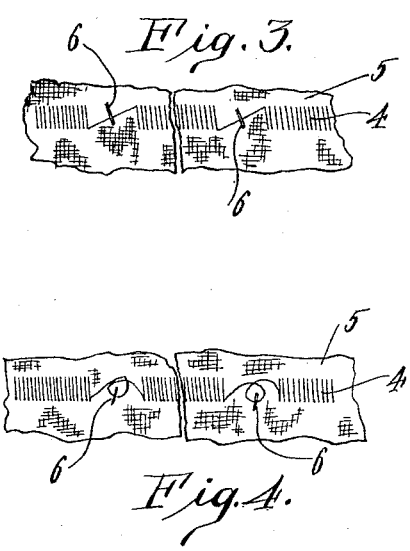
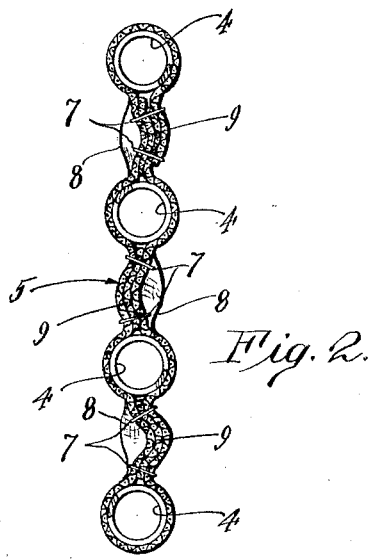
Inventor
Warren H. Frost.
By Lyon & Lyon
Attorneys Patented Feb. 14, 1928.

1,659,195

UNITED STATES PATENT OFFICE.

WARREN H. FROST, OF LONG BEACH, CALIFORNIA, ASSIGNOR TO STEELLASTIC COMPANY, OF LOS ANGELES, CALIFORNIA, A CORPORATION OF CALIFORNIA.

ELASTIC MATERIAL.

Application filed November 18, 1925. Serial No. 69,804.

This invention relates to elastic materials which may be made and sold by linear measurement, and an object of the invention, in general, is to provide a construction that employs coil springs and that will be a suitable substitute for fabric elastic employing rubber strands.

It is a matter of common knowledge that rubber is a perishable product, and soon loses its elasticity and that it stretches out and disintegrates, thus rendering useless the fabric in which it is woven.

An object of this invention is to produce an elastic material in the form of a strip that will possess the elasticity of rubber at its best while providing permanency of elasticity and unvariability in the elastic tension. Fundamentally, the inventive idea resides in the employment of small coil springs in place of rubber strands. The idea of employing coil springs is not new but, in order that they may be an effective substitute for rubber, I have provided certain structural features not heretofore employed.

In order to overcome some of the difficulties arising from the use of coil springs, in place of rubber, for elastic material made in long strips, I provide a covering of flexible material, such as cloth or leather, for the coil springs to protect them and also limit their extension.

While it is not new to employ a covering for the springs there is a serious fault in the old construction employing coil springs with cloth coverings, for, when the springs are relatively long and of fine wire, as is desirable when the springs are used in multiple in lieu of rubber strands, they are liable to catch at some point on the cloth while the springs are being extended, thus causing such extreme extension of portions of the springs as to give a permanent set to the coils of said portions, resulting in destruction of the elasticity of such portions.

To avoid the difficulty just mentioned, I fasten each coil spring at intervals to a strip of cloth or other suitable flexible material and said strip is preferably in the form of a sheath or casing which encloses the springs, thus forming a longitudinally extending series of elastic sections. When expansion of the springs takes place, the pull comes upon the spring section at the points of attachment of said sections to the strip, thus causing a uniform expansion of the several spring sections throughout the length of the spring, and no spring section can be extended beyond the length of strip lying between the points of connection of said spring section with the strip. This construction is especially valuable where the elastic material is to be employed for circular garters, belts, suspenders, or in any articles where a considerable length of elastic material is required.

The accompanying drawings illustrate the invention.

Fig. 1 is a broken longitudinal view of a strip of elastic material constructed in accordance with the provisions of this invention, a portion of the casing or sheath for the springs being broken away.

Fig. 2 is an enlarged cross section on the line indicated by 2—2, Fig. 1.

Fig. 3 is an enlarged, fragmental view to illustrate one way of fastening the coil springs to the sheath.

Fig. 4 is an enlarged, fragmental view to illustrate another way of fastening the coil springs to the sheath.

There are provided a number of relatively long coil springs 4. These springs may be made of any length that it is practicable to manufacture them. The springs are secured at intervals to a strip of fabric or other suitable flexible material 5 by any suitable means, such means, in this instance, being thread 6. The material 5 is of double thickness to form a tubular sheath or casing so as to lie on opposite sides of the springs and, preferably, the threads 6 pass through both thicknesses of the material. Each spring 4 lies within a separate pocket and the several pockets are separated from one another by double rows of stitching 7 and the material is fulled so as to produce transversely extending shirrs or gathers 8. The shirrs 8 lie between adjacent springs and prevent the springs from drawing together sidewise into a relatively narrow band as would result if only a single row of stitching were employed between adjacent springs.

The material 5 will be "full" when the springs are contracted and the distance between the adjacent threads 6 on each spring is such that, when the material between said threads is fully extended, the section of spring lying between said threads cannot be extended or stretched sufficiently to give a permanent set to the coils of said section.

The elastic material described above will be sold in long strips and the clerk or the purchaser can cut off the amount desired for making a circle garter or other article employing an elastic element.

For securing the spring to the sheath the coils of the spring may be opened out at intervals, as indicated in Fig. 3, and the threads 6 will engage the opened coils; or the coils at intervals may be bent at right angles with the remainder of the coils, as indicated in Fig. 4, and the threads will engage the loops thus made.

To still further insure against the springs drawing together and unduly narrowing the strip of elastic material, especially when the flexible material 5 is a relatively soft, fine fabric, such for example as silk, I may employ a filler strip 9 between each two adjacent springs to stiffen the material 5 transversely. The filler strips 9 may be held in place, if desired, by passing either or both of the rows of stitching 7 through the filler strips. The filler strips may be made of a single thickness of relatively heavy material such, for example, as canvas, or said strips may be made of several thicknesses of a thinner material such as the material of which the strip 5 is made.

I claim:

1. An elastic material comprising a strip of flexible material of double thickness, a plurality of coil springs attached at their ends and at intervals intermediate of their ends to and enclosed in the material, and stitching between adjacent springs, said material forming shirrs in the spaces between adjacent springs when the springs are contracted.

2. An elastic material comprising a strip of flexible material forming a tubular casing, said casing having tubular pockets separated from one another by double rows of stitching, a coil spring in each pocket, and means attaching the springs at their ends and at intervals intermediate of their ends to the casing, the casing being "full" when the springs are contracted and the distance between adjacent points of attachment being such that the section of spring lying between such points of attachment cannot be stretched sufficiently to give a permanent set to the coils of said section.

3. An elastic material comprising a strip of flexible material, and a coil spring secured at its ends and at intervals intermediate of its ends to said strip, said material being full between the points of attachment of the spring when the spring is contracted.

4. An elastic material comprising a strip of flexible material of double thickness, and a coil spring attached at its ends and at intervals intermediate of its ends to the strip and enclosed thereby, said material being full between the points of attachment of the spring when the spring is contracted.

5. An elastic material comprising a strip of flexible material, and a plurality of coil springs secured at their ends and at intervals intermediate of their ends to said strip, there being a row of stitching between each two adjacent springs and the material being full between points of attachment of the springs when the springs are contracted.

6. An elastic material comprising a strip of flexible material, and a plurality of coil springs secured at their ends and at intervals intermediate of their ends to said strip, there being a double row of stitching between each two adjacent springs and the material being full between the points of attachment of the springs when the springs are contracted.

7. An elastic material comprising a strip of flexible material, a plurality of coil springs extending along and secured to the strip, and a filler strip between adjacent springs secured to the first strip.

8. An elastic material comprising a casing of flexible material, a plurality of coil springs enclosed in the casing, and a filler strip between adjacent springs.

9. An elastic material comprising a casing of flexible material, a plurality of coil springs enclosed in the casing, and a filler strip between adjacent springs, said filler strip being secured to the casing.

10. An elastic material comprising a strip of flexible material, a plurality of coil springs secured at their ends and at intervals intermediate of their ends to said material, and a filler strip between adjacent springs, said filler strip being secured to the first strip.

11. An elastic material comprising a casing of flexible material, a plurality of coil springs enclosed in the casing and secured at their ends and at intervals intermediate of their ends thereto, and a filler strip between adjacent springs.

12. An elastic material comprising a casing of flexible material, a plurality of coil springs enclosed in the casing and extending side by side lengthwise of the casing, and a plurality of rows of stitching connecting the opposite walls of the casing between each two adjacent springs and extending from end to end of the springs.

13. An elastic material comprising a casing of flexible material, a plurality of coil springs enclosed in the casing and secured at their ends and at intervals intermediate of their ends thereto, and a plurality of rows of stitching connecting the opposite walls of the casing between each two adjacent springs.

Signed at Los Angeles, Calif., this 28th day of August, 1925.

WARREN H. FROST.